(12) United States Patent
Gao et al.

(10) Patent No.: US 12,369,126 B2
(45) Date of Patent: Jul. 22, 2025

(54) METHODS AND SYSTEMS FOR TRACKING REFERENCE SIGNAL PATH LOSSES IN UPLINK TRANSMISSIONS (71) Applicant: ZTE Corporation, Guangdong (CN)

(72) Inventors: Bo Gao, Guangdong (CN); Zhaohua Lu, Guangdong (CN); Ke Yao, Guangdong (CN); Shujuan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 299 days.

(21) Appl. No.: 17/856,200

(22) Filed: Jul. 1, 2022

(65) Prior Publication Data

US 2022/0338127 A1    Oct. 20, 2022

Related U.S. Application Data

(63) Continuation of application No. PCT/CN2020/084156, filed on Apr. 10, 2020.

(51) Int. Cl.
*H04L 5/00* (2006.01)
*H04W 52/14* (2009.01)
*H04W 52/24* (2009.01)

(52) U.S. Cl.
CPC ......... *H04W 52/146* (2013.01); *H04L 5/0051* (2013.01); *H04W 52/242* (2013.01)

(58) Field of Classification Search
CPC .............. H04W 52/146; H04W 52/242; H04L 5/0051
USPC ........................................................ 370/318
See application file for complete search history.

(56) References Cited

U.S. PATENT DOCUMENTS

| 10,602,456 | B2 | 3/2020 | Li et al. | |
| 11,122,572 | B2 | 9/2021 | Ji et al. | |
| 2012/0329503 | A1 | 12/2012 | Jöngren et al. | |
| 2013/0102345 | A1* | 4/2013 | Jung | H04B 7/0617 455/513 |
| 2014/0112260 | A1 | 4/2014 | Sorrentino | |
| 2019/0215777 | A1* | 7/2019 | Kang | H04W 52/42 |
| 2019/0335400 | A1 | 10/2019 | Gong et al. | |

(Continued)

FOREIGN PATENT DOCUMENTS

| CN | 101873657 A | 10/2010 |
| CN | 102395184 A | 3/2012 |

(Continued)

OTHER PUBLICATIONS

International Search Report from WO 2021/109400, dated Dec. 28, 2020.

(Continued)

*Primary Examiner* — Christopher R Crompton
(74) *Attorney, Agent, or Firm* — Crowell & Moring LLP (57) ABSTRACT

Methods and systems for controlling a transmit power of a wireless communication device are disclosed herein. In one embodiment, a method includes: determining one or more reference signals transmitted by a wireless communication node; maintaining one or more path loss estimates for the one or more reference signals; associating at least one path loss estimate with an uplink (UL) signal; calculating a transmission power of the UL signal according to the at least one path loss estimate; and transmitting the UL signal in accordance with the calculated transmission power.

18 Claims, 7 Drawing Sheets

(56) References Cited

U.S. PATENT DOCUMENTS

| | | | |
|---|---|---|---|
| 2019/0349964 A1 | 11/2019 | Liou | |
| 2020/0053799 A1* | 2/2020 | Jeon | H04W 16/14 |
| 2020/0383060 A1 | 12/2020 | Park et al. | |

FOREIGN PATENT DOCUMENTS

| | | | |
|---|---|---|---|
| CN | 103037488 A | 4/2013 |
| CN | 107734624 A | 2/2018 |
| CN | 110492913 A | 11/2019 |
| WO | WO 2018/128409 A1 | 7/2018 |
| WO | WO 2018/139965 A1 | 8/2018 |

OTHER PUBLICATIONS

Extended European Search Report Issue in European Patent Application No. 20895037.8 dated Nov. 14, 2022, 7 pages.

Office Action issued in Chinese Patent Application No. 2020800895087 dated Jul. 31, 2024, w/English translation, 24 pages.

Motorola Mobility et al. "Remaining details on CA-related NR UL power control" 3GPP TSG RAN WG1 #92bis, R1-1807279, 6 pages.

Office Action issued in Korean Patent Application No. 10-2022-7022767 dated Jul. 22, 2024, w/English translation, 13 pages.

MCC Support; Final Report of 3GPP TSG RAN WG1 #92 v1.0.0; 3GPP TSG RAN WG1 Meeting #92bis; R1-1803571; Apr. 16, 2018 (187 pages).

3rd Generation Partnership Project; Technical Specification Group Radio Access Network; NR; Radio Resource Control (RRC) protocol specification (Release 16); 3GPP TS 38.331; Mar. 2020 (835 pages).

InterDigital, Inc. "Aspects related to Supplementary Uplink" 3GPP TSG RAN WG1 Meeting AH1801, R1-1800605, 5 pages.

LG Electronics, "Feature lead summary ofEnhancements on Multi beam Ogerations," 3GPP TSG RAN WG1 Meeting #98, R1 1909486, 35 pages.

Chen et al. "Analysis and design of uplink resource scheduling in narrow band Internet of things" Journal of Computer Applications, vol. 38, No. 11, Nov. 10, 2018, w/English Abstract only, 6 pages.

Examination Search Report issued in Canadian Patent Application No. 3,162,062, dated Oct. 30, 2024, 4 pages.

Notification of Second Office Action issued in Chinese Patent Application No. 202080089508.7, dated Nov. 14, 2024, 2 pages.

Office Action Issued in Chinese Patent Application No. 202080089508. 7, dated Nov. 14, 2024, 12 pages, w/Partial English Translation.

Examination Report issued in Indonesia Patent Application No. P00202206916 dated Jan. 30, 2025 (6 pages) with English Translation.

Communication Pursuant Article 94(3) EPC issued in EP Application No. 20 895 037.8 dated Jan. 16, 2025 (5 pages).

\* cited by examiner

FIG. 7 ured tracking of RS path losses are not satisfactory.

METHODS AND SYSTEMS FOR TRACKING REFERENCE SIGNAL PATH LOSSES IN UPLINK TRANSMISSIONS

This application is a continuation application of PCT International Application No. PCT/2020/084156, filed with the China National Intellectual Property Administration, PRC on Apr. 10, 2020, which is herein incorporated by reference in its entirety.

TECHNICAL FIELD

The disclosure relates generally to wireless communications and, more particularly, to methods and systems for tracking reference signal (RS) path losses for uplink transmissions in wireless communication networks.

BACKGROUND

To meet the ever-increasing demand for wireless data traffic, 5G communication systems will utilize higher frequency (mmWave) bands, e.g., 30 to 200 GHz bands, to achieve higher data rates. One challenge of using such wide or ultra-wide spectrum resources, however, is to mitigate the considerable propagation loss induced by the extremely high frequencies. To solve this problem, antenna array and beam-forming training technologies using massive multiple-in-multiple-out (MIMO), e.g., up to 1024 antenna elements for one node, have been adopted to achieve beam alignment and obtain sufficiently high antenna gain.

To lower implementation costs while still benefitting from antenna array techniques, analog phase shifters have become attractive for implementing millimeter (mm) wavelength beam-forming (BF) techniques, which means that the number of controllable phases is finite and constant modulus constraints are placed on the antenna elements of the antenna array. Since beam patterns are pre-specified, variable-phase-shift-based BF training attempts to identify the best pattern for subsequent data transmission between one transmission point (TRP) and one antenna array panel, for example.

Figure 1:
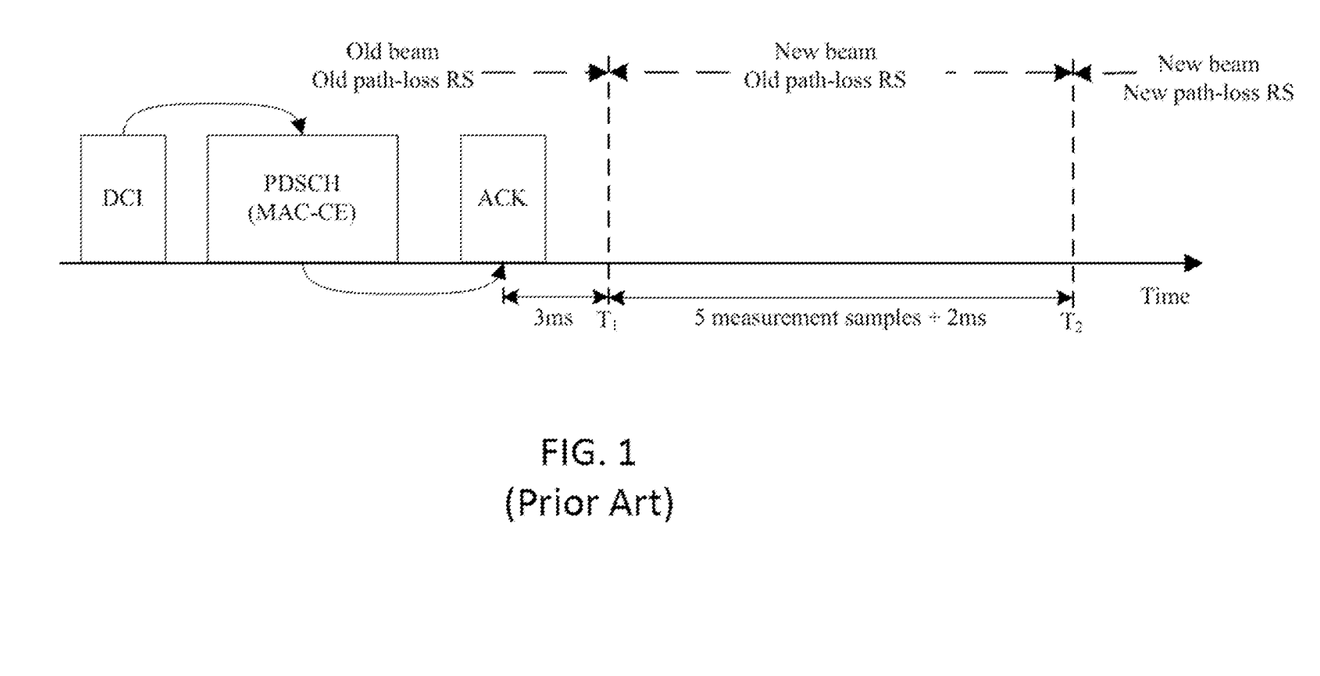
FIG. 1 illustrates a timing diagram illustrating a mismatch in timing of providing new reference signal path loss information and allocating a new transmission beam to a UE, associated with prior art methods and systems.

For medium access control-control element (MAC-CE) based uplink (UL) spatial relation activation (e.g., for PUCCH or aperiodic/semi-persistent sounding reference signal (SRS)), a new spatial relation should be applied starting from 3 milliseconds (ms) after receiving a hybrid automatic repeat request (HARQ) acknowledge (ACK). For example, as shown in FIG. 1, after receiving DCI, PDSCH (MAC-CE) and ACK signaling, a new beam corresponding to an updated path-loss RS can be transmitted by the UE approximately 3 ms after receiving the ACK signal. However, under current techniques for MAC-CE based path-loss reference signal (RS) updates (e.g., for PUSCH and SRS regardless of explicit configuration or default mode), the new path-loss RS estimates are applied starting from a time instant of receiving the ACK signal plus 3 ms plus X measurement samples+2 ms, where X is the number of measurement samples utilized by a UE to perform RS path loss measurements (e.g., X is 5). Thus, under current techniques, the new path-loss RS will be applied approximately 100 ms after the time instant of receiving the ACK signal.

Thus, if the MAC-CE commands for updating spatial relation and path-loss RS (e.g., TCI state update for CORE-SET with lowest ID for default beam and path-loss case) is transmitted through the same PDSCH, there is a long-time mismatch between an updated (i.e., new) spatial relation/beam indication and an updated path-loss RS indication, as shown in FIG. 1. As a result, the closed loop UL transmission will be accumulated and compensated based on a mismatched path-loss RS, and some serious fluctuation of UL transmission/reception power may be experienced with high probability, e.g., at times T1 and T2, as shown in the FIG. 1. With incorrect path-loss compensation (e.g., a bigger path-loss compensation for a bad-quality link corresponding to old path-loss RS vs. a smaller path-loss compensation for a good-quality link corresponding to new path-loss RS in T2), the received quality of an UL signal may be significantly degraded from the perspective of the base station (e.g., gNB). Thus, existing methods and systems for tracking and measuring RS path losses are not satisfactory.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method for controlling a transmit power of a wireless communication device, includes: determining one or more reference signals transmitted by a wireless communication node; maintaining one or more path loss estimates for the one or more reference signals; associating at least one path loss estimate with an uplink (UL) signal; calculating a transmission power of the UL signal according to the at least one path loss estimate; and transmitting the UL signal in accordance with the calculated transmission power.

In another embodiment, a method for controlling a transmit power of a wireless communication device, includes: transmitting the one or more reference signals for path-loss measurement to the wireless communication device; transmitting a command that associates an uplink (UL) signal with at least one of the one or more reference signals; and receiving the UL signal.

In further embodiments, the disclosure provides a non-transitory computer-readable storage medium storing computer-executable instructions that when executed perform any one of the methods disclosed herein.

In yet further embodiments, a wireless communication device, includes: a memory storing computer-executable instructions that when executed perform any one of the methods performed by the wireless communication device disclosed herein; at least one processor, coupled to the memory, and configured to execute the computer-executable instructions; and a transmitter configured to transmit the UL signal in accordance with the calculated transmission power.

In other embodiments, a wireless communication node, comprises: a memory storing computer-executable instructions that when executed perform any one of the methods performed by the wireless communication node disclosed herein; at least one processor, coupled to the memory, and configured to execute the computer-executable instructions; and a transmitter configured to transmit the one or more reference signals for path-loss measurement and transmit a command that associates an uplink (UL) signal with at least one of the one or more reference signals; and a receiver configured to receive the UL signal.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

As discussed above, analog beam-forming techniques for mobile communications is utilized for guaranteeing the robustness of high frequency communications in 5G new radio (NR) communication systems. The corresponding analog beam-forming indication (a.k.a., "beam indication") involves both downlink (DL) and uplink (UL) transmissions. For UL transmissions, spatial relation information (e.g., higher layer parameters such as spatialRelationInfo) has been introduced for supporting beam indications for the UL control channel, i.e., physical uplink control channel (PUCCH), and the sounding reference signal (SRS). Additionally, the beam indication for the UL data channel, i.e., physical uplink shared channel (PUSCH), is achieved through mapping between one or more SRS resources, which are indicated by the base station (BS) (e.g., gNB), and antenna ports of the UL data channel. This means that the beam configuration for the UL data channel can be derived from the spatial relation information association/mapping information between the SRS resources and antenna ports accordingly.

In order to reduce the overhead requirements for higher layer parameters, the default spatial relation and path loss RS for PUCCH and SRS transmission can be further determined according to a quasi-co-location (QCL) assumption of a control resource set (CORESET) or an activated physical downlink shared channel (PDSCH) transmission configuration (TCI) state, when spatial relation information for the PUCCH and SRS has not been configured. Additionally, another candidate solution would utilize a unified indication of the QCL assumption, spatial relation and path loss RS for both DL and UL data and control channels through one dynamic command (e.g., a MAC-CE or DCI indication) transmitted by the BS.

Depending the capabilities of the UE, however, a maximum number of path-loss estimates that can be maintained at a given time is limited. For example, a UE may be able to track only up to 4 path-loss RS(s) during a given time period or instant. Additionally, once an unknown/non-tracked RS is indicated as a path-loss RS by a MAC-CE/DCI command transmitted by the BS, there is a long latency from indicating the path-loss RS to applying a path-loss value corresponding to the newly indicated path-loss RS (e.g., 5 measurement samples plus 2 ms), as described above. On the BS side, the corresponding UL beam/spatial relation can be applied immediately. During this period from the time instant of indicating a new path-loss RS to that of applying an effective path-loss estimate corresponding to the new path-loss RS, the UE has to use an old path-loss estimate corresponding to the old path-loss RS. Consequently, there is a mismatch in time between applying an effective UL beam/spatial relation for new beams and applying an effective path-loss RS estimate (only old beam path loss estimate is available), which means that there is an incorrect power compensation for UL transmission. This incorrect power compensation becomes more serious in the UE high-speed movement scenario. In order to improve UL transmissions, in accordance with various embodiments, the following issues are addressed, among others.

In the default beam and path-loss RS mode, only one path-loss RS is activated and tracked for subsequent UL transmission, but the UE may support multiple path-loss RSs for tracking, e.g., 4. In other words, the number of activated path-loss RSs may be less than a UE's capability. Thus, since additional path-loss RS(s) can be tracked by the UE besides the effective/activate default path-loss RS, the BS should have a mechanism of pre-activating some candidate path-loss RS(s) for the subsequent path-loss estimate switching.

In contrast, for unified TCI configuration for both DL and UL transmissions, multiple TCI states can be simultaneously activated (e.g., 8 or 16 TCI states). However, tracking the path-loss RS(s) for each of these states (e.g., 8 or 16 TCI states) may be beyond the UE's capability (e.g., UE can only track a maximum of 4 path-loss RSs). Therefore, priority rules for determining which path-loss RSs to be tracked based on a UE's capability should be specified in order to keep the same understanding between the BS and UE.

Additionally, a method of counting path loss RSs to be maintained for numerous scenarios of tracking path-loss RSs is disclosed herein, in accordance with various embodiments. Such scenarios include default beam and path-loss RS, unified TCI, RRC-based path-loss RS configuration and MAC-CE based path-loss RS update, etc.

In the present disclosure, the following acronyms and definitions are used:
BS: Base station
BWP: Bandwidth part
CORESET: Control resource set
CSI-RS: Channel state information reference signal
DMRS: Demodulation reference signal
MIB: Master information block
PBCH: Physical broadcast channel
PDCCH: Physical downlink control channel
PDSCH: Physical downlink sharing channel
PUSCH: Physical uplink sharing channel
PUCCH: Physical uplink control channel
QCL: Quasi co-location
RS: Reference signal
SRS: Sounding reference signal
SS: Synchronization signal
TCI: Transmission configuration indicator
TRP: Transmission point
UE: User equipment device As used herein, the term "transmission state" generally refers to and encompasses the following: quasi-co-location (QCL) state, transmission configuration indicator (TCI) state, spatial relation (also called as spatial relation information), reference signal (RS), physical random access channel (PRACH)), spatial filter or pre-coding. More specifically, as used herein, the term "transmission state ID" generally refers to and encompasses the following: QCL state index, TCI state index, spatial relation index, reference signal index, spatial filter index or precoding index.

As used herein, the term "reference signal" generally refers to and encompasses the following: channel state information reference signal (CSI-RS), synchronization signal block (SSB) (which is also called as SS/PBCH), demodulation reference signal (DMRS), sounding reference signal (SRS) or physical random access channel (PRACH). Additionally, as used herein, the term "spatial filter" refers to either a UE-side or BS-side spatial filter, and includes spatial-domain filters. Furthermore, the term "spatial relation information" refers to a type of transmission parameter, which includes one or more RSs, and can be associated or configured with a target RS or channel. Thus, the target RS or channel should be transmitted with the same or quasi-co "spatial relation" as the one or more reference RSs by the UE. The term "spatial relation" can be a beam, spatial parameter, or spatial domain filter.

Additionally, the term "QCL state" refers to one or more reference RSs and their corresponding QCL type parameters, where QCL type parameters include at least one of the following aspects: [1] Doppler spread, [2] Doppler shift, [3] delay spread, [4] average delay, [5] average gain, and [6] spatial parameter (a.k.a., spatial Rx parameter). As used herein, the term "TCI state" is equivalent to "QCL state."

Further, in the present disclosure, the following definitions for 'QCL-TypeA', 'QCL-TypeB', 'QCL-TypeC', and 'QCL-TypeD' are utilized:
'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the present disclosure, a "UL signal" can be a PRACH, PUCCH, PUSCH, or SRS. A "DL signal" can be a PDCCH, PDSCH, or CSI-RS. A "time unit" can be a sub-symbol, symbol, slot, sub-frame, frame, or transmission occasion. Additionally, a "UL power control parameter" includes a target power parameter (also called as P0), a path loss RS parameter, a scaling factor for path loss (a.k.a., alpha), or a closed loop process parameter. Additionally, as used herein, the term "path-loss" can include a coupling loss. In the present disclosure, a "cell" or "serving cell" can be a carrier component (CC). In the present disclosure, "maintaining a path loss estimate for a reference signal" is synonymous with "tracking a reference signal for path loss calculation."

As discussed herein, a "wireless communication node" can include, or be implemented as, base station (BS), a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc., in accordance with the customary understanding of these terms in the art.

Furthermore, as discussed herein, a "wireless communication device" can include, or be implemented as, user equipment device (UE), a station (STA), a mobile terminal (MT), mobile station (MS), etc., in accordance with the customary understanding of these terms in the art. In the description of exemplary embodiments below, the "wireless communication node" is generally referred to as a "base station" or "BS," and the "wireless communication device" is generally referred to as a "user equipment device" or "UE." It should be understood, however, that the scope of the present disclosure is not limited to these exemplary embodiments.

Figure 2:
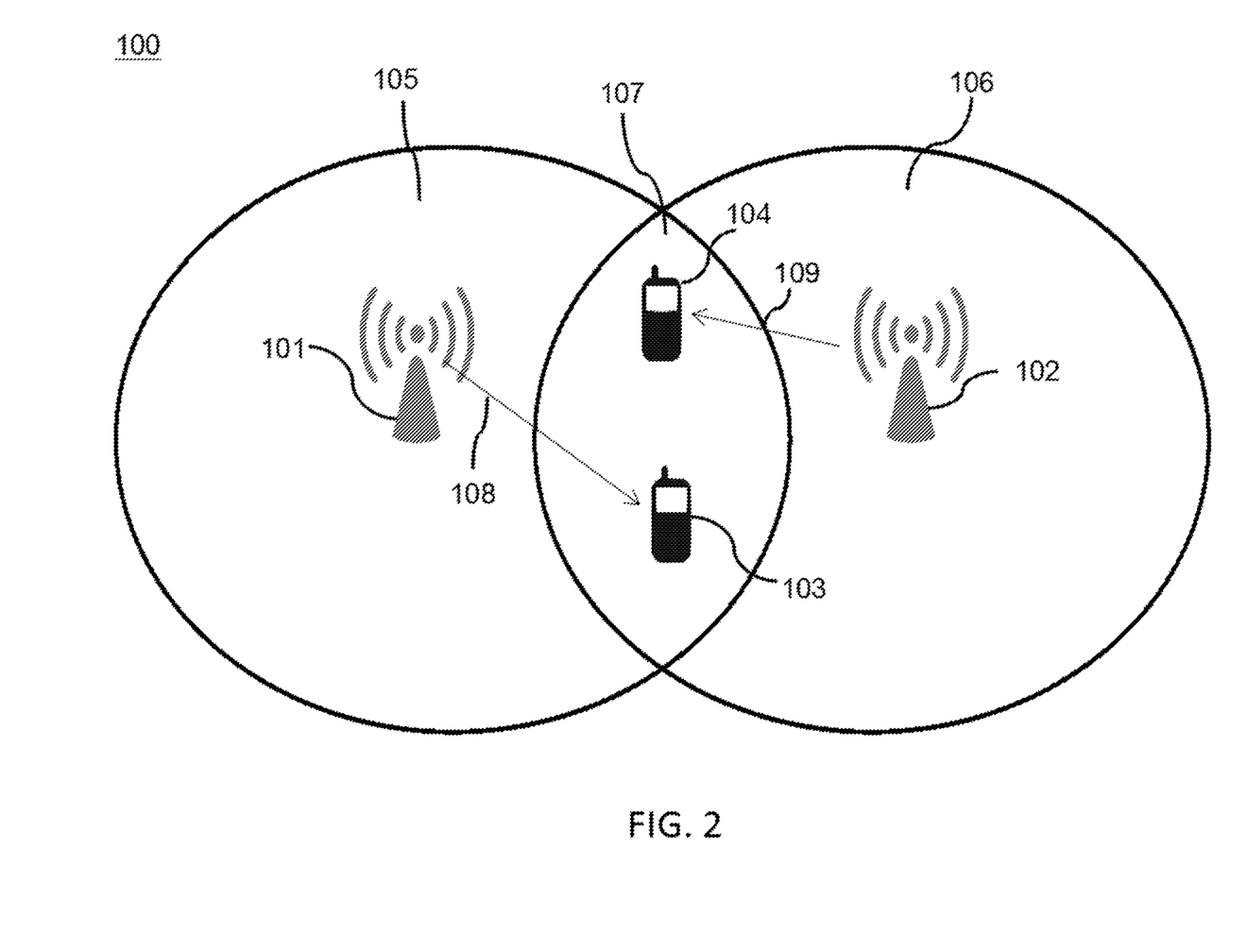
FIG. 2 illustrates an exemplary wireless communication network in which methods and systems disclosed herein can be implemented, in accordance with some embodiments of the disclosure.

FIG. 2 illustrates an exemplary communication network 100 in which RS path loss tracking and maintenance techniques disclosed herein may be implemented, in accordance with various embodiments of the disclosure. As shown in FIG. 2, the exemplary communication network 100 includes a first BS 101, a second BS 102 and a plurality of UEs, e.g., a first UE 103 and a second UE 104, communicatively coupled to the first and second BSs 101 and 102 via respective RF links 108 and 109. In some embodiments, the RF links 108, 109 operate in the millimeter wave radio frequency band, such as the 60 GHz unlicensed band. FIG. 2 also illustrates a wireless cell coverage 105 of the first BS 101 and a wireless cell coverage 106 of the second BS 102. In some embodiments, the wireless cells 105 and 106 may have an overlapping coverage area 107, as shown in FIG. 2. In further embodiments, UEs 102 and 103 may be co-located in the overlapping coverage area 107, near the cell-edges of the wireless cells 105 and 106. Thus, the present disclosure describes systems and methods for providing inter-cell interference nulling for stations located in overlapping coverage area 107, in accordance with some embodiments.

In accordance with various embodiments, the BSs 101 and 102 may each be equipped with multiple antennas (e.g., an antenna array) configured to provide a multiple-input multiple output (MIMO) link with the plurality of UEs 103 and 104. In alternative embodiments, the BSs 101 and 102 may each be equipped with a phased array antenna capable of forming one or more beams of radio waves that can be electronically steered. Although only two BSs 101 and 102, and only two UEs 103 and 104, are shown in FIG. 2, it is understood that additional BSs and additional UEs can be present in the wireless network to implement the RS path loss tracking and maintenance techniques described herein, in accordance with various embodiments of the disclosure.

Similar to the BSs 101 and 102, the UEs 103 and 104 may each also include multiple antennas or a phased antenna array. As shown in FIG. 2, the first BS 101 is configured to generate and transmit a DL beam 108 to the first UE 103, and the second BS 103 is configured to generate and transmit a DL beam 109 to the second UE 104. In accordance with various embodiments, the first and second BSs 101 and 102 may each utilize any precoding schemes to form the transmission beams 108 and 109. For example, the BSs 101 and 102 may utilize a linear precoding technique, such as the zero-forcing (ZF) beamforming method to transmit beams toward UEs 103 and 104. Such precoding enables the BSs 101 and 102 to create antenna patterns that favor wave propagation along desired spatial directions while attenuating (nulling) propagation along undesired directions.

In some embodiments, the BSs 101 and 102 rely on estimated RS path loss, which describes channel properties of the RF links between a transmitter and a receiver, to form data transmission beams 108 and 109, respectively. Furthermore, RSs (e.g., CSI-RS) may represent the propagation state of a communication link from a transmitter to a receiver such as the aggregate effect of scattering, fading, and power decay with distance, for example. In general, a receiver can estimate the path loss by tracking a predefined signal (such as reference signal, training signal or pilot signal) in the received wireless frame. Thus, path loss RS tracking makes it possible to adapt transmissions in accordance with channel conditions so that a higher network throughput and spectrum efficiency can be achieved in MIMO systems.

In accordance with some embodiments, the UE operates in the default beam and path-loss mode, in which only one default path-loss RS can be activated. Typically, the default path-loss RS is determined according to the transmission state or QCL assumption of a CORESET with lowest ID in the active BWP/serving cell, or according to the active transmission state with lowest ID for PDSCH transmission in the active BWP/serving cell. In this default mode, when the default path-loss RS is updated by a MAC-CE command transmitted by the gNB, the long latency of calculating path-loss will occur (e.g., 5 measurement samples+several ms=100 ms) resulting in a mismatch in timing when a new beam can be transmitted and when the newly calculated path loss can be applied, as described above.

To address the above mismatch in timing problem, in some embodiments, the UE can determine one or more reference signals transmitted by the BS to be tracked in advance (i.e., prior to when the default path-loss reference signal assigned to the UE is updated by the BS). The UE then tracks the one or more reference signals and calculates one or more path loss estimates for the one or more reference signals, respectively. In some embodiments, the UE then filters several path loss estimates corresponding to a reference signal into filtered path loss estimates within a given time duration or some measurement samples, and stores the filtered path loss estimate for each of the one or more reference signals in a memory of the UE. Thus, upon receiving an updated default path-loss reference signal, if the updated default path-loss reference signal corresponds to one of the path loss estimates calculated in advance, the UE can associate the previously calculated and stored path loss estimate with an UL signal to be transmitted. Thus, the associated path-loss estimate can be applied at the same time that a new UL transmission beam corresponding to the updated path-loss RS is transmitted. The UE further calculates a transmission power of an uplink (UL) signal to be transmitted according to the previously calculated path loss estimate, and then transmits the UL signal in accordance with the calculated transmission power using a transmission beam associated with the updated path-loss RS.

From the perspective of the BS, in accordance with some embodiments, in order to address the above mismatch in timing problem, the BS transmits the one or more reference signals for path-loss measurement to the UE. Then, the BS transmit a command that associates an uplink (UL) signal with at least one of the one or more reference signals to UE side; and thereafter receives the UL signal from UE. In some embodiments, the BS transmits a medium access control-control element (MAC-CE) to activate one or more reference signals from a set of reference signals configured by radio resource control (RRC) signaling. The path loss measurement for the activated reference signal(s) is performed from N1 time units after an acknowledge (ACK) signal corresponding to a physical downlink shared channel (PDSCH) carrying the MAC-CE is transmitted, wherein N1 is a positive value. Then, the path loss estimate corresponding to the reference signal is valid N2 milliseconds (ms) after X measurement samples of the activated reference signal are measured, wherein N2 is a positive value and X is a positive integer. In some embodiments, the X corresponds to a maximum number of measurement samples supported by the UE.

In some embodiments, in a default beam and path-loss mode, if the UE is capable of tracking and maintaining two or more (e.g., 4) path-lass RSs during a given time period or instant, one or more additional path-loss RSs can be tracked in advance by the UE, in accordance with some embodiments of the disclosure. In some embodiments, one or more of the following candidate RSs are tracked and maintained in advance by the UE:

a reference signal in a transmission state or a quasi co-location (QCL) assumption transmitted in a predetermined control resource set (CORESET), wherein the predetermined CORESET is associated with one of: a Mth lowest identification (ID) value, Nth highest ID value, and a predetermined ID value, wherein M and N are integers. In some embodiments, the predetermined CORESET is contained in an active BWP.

a reference signal in a transmission state or reference signal associated with a quasi co-location (QCL) assumption transmitted in a control resource set (CORESET) that is not associated with any search spaces. In some embodiments, this CORESET is contained in an active BWP, however, it is a blank CORESET that is not used to carry a PDCCH transmission, but instead, it is only used to provide the transmission state or QCL assumption for determining the path-loss RS.

a reference signal in an active transmission state associated with a predetermined identification (ID) value, the predetermined ID value being one of: a Mth lowest ID value among a plurality of ID values, a Nth highest ID value among the plurality of ID values, and a predetermined integer, wherein M and N are integers.

a reference signal associated with an active transmission codepoint having a predetermined identification (ID)

value, the predetermined ID value being one of: a lowest ID value, a highest ID value, and a predetermined integer. In some embodiments, the active transmission codepoint is associated with one or more transmission states, e.g., by a MAC-CE command. In some embodiments, a CORESET is not contained in an active BWP of the UL signal. As user herein, a "codepoint" or "codepoint ID" refers to a number or index of a state ID configured at the MAC-CE level.

- a synchronization signal block (SSB) that enables the wireless communication device to obtain master information block (MIB) information.
- a reference signal associated with a configured grant transmission.

In some embodiments, if the number of candidate RSs for tracking in advance is beyond the UE's capability, in a carrier aggregation (CA) scenario for example, one or more priority rules for selecting candidate path loss RSs are implemented. In some embodiments, a first prior rule is that the following path-loss RSs are ordered from highest to lowest priority:

1. a reference signal associated with a configured grant transmission;
2. a medium access control-control element (MAC-CE) updated reference signal, if a number of radio resource control (RRC) configured reference signals is greater than 4; otherwise select a RRC configured reference signal;
3. a reference signal in a transmission state or reference signal associated with a quasi co-location (QCL) assumption transmitted in a predetermined control resource set (CORESET), wherein the predetermined CORESET is associated with a lowest identification (ID) value among a plurality of ID values and is contained in an active bandwidth part (BWP) allocated for the wireless communication device;
4. a reference signal in an active transmission state associated with a lowest identification (ID) value among a plurality of ID values and contained in the active BWP; and
5. a synchronization signal block (SSB) that enables the wireless communication device to obtain master information block (MIB) information.

In alternative embodiments, a predetermined priority rule includes selecting one or more RSs in the following priority order:

1. a reference signal in a transmission state or a reference signal associated with a quasi co-location (QCL) assumption in a lowest or highest X CORESET(s) not associated with any search space, wherein X is a positive integer and the X CORESET(s) are contained in a corresponding cell/active BWP; and
2. a reference signal in an active transmission or transmission codepoint with a lowest, highest or predetermined identification (ID) value, and there are no CORESET(s) in the corresponding cell/active BWP.

In some embodiments, the predetermined priority rule gives higher priority to reference signals that are activated by a MAC-CE or configured by RRC over reference signals in a transmission state or associated with a quasi co-location (QCL) assumption. In some embodiments, the predetermined priority rule gives higher priority to a reference signal in a transmission state or a quasi co-location (QCL) assumption in a control resource set (CORESET) over a reference signal in an active transmission state for a physical downlink shared channel (PDSCH). In other embodiments, the predetermined priority rule gives higher priority to a reference signal in an active transmission state for a physical downlink shared channel (PDSCH) over a reference signal in a transmission state or associated with a quasi co-location (QCL) assumption. In some embodiments, the transmission state or QCL assumption is associated with a control resource set (CORESET). In some embodiments, the transmission state is the active transmission state for the PDSCH.

In another embodiment, the predetermined priority rule preferentially selects a reference signal associated with a cell having a lowest identification (ID). In a further embodiment, the predetermined priority rule preferentially selects a reference signal associated with a primary cell (PCell) or primary secondary cell (PSCell) before a reference signal associated with a secondary cell (SCell).

Figure 3:
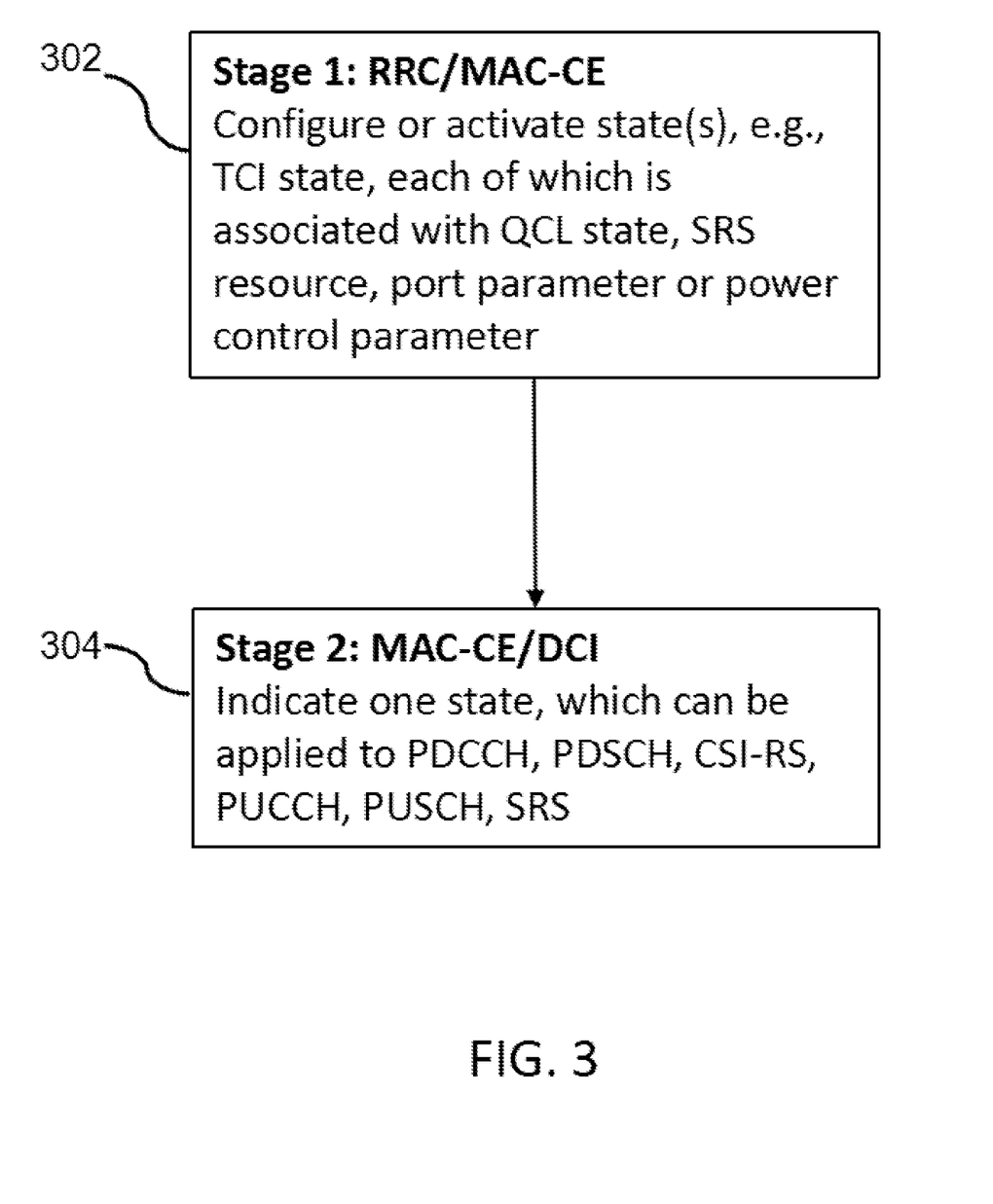
FIG. 3 illustrates a flow chart of a method of determining a state of a reference signal to be tracked, in accordance with some embodiments.

In some embodiments, when the mechanisms of RRC and MAC-CE, or RRC and DCI signaling, are used for indicating one transmission state for DL and UL transmissions, only one path-loss RS is activated at a given time instant from a plurality of possible transmission states. FIG. 3 illustrates a flow chart of this process, in accordance with some embodiments. In a first stage 302, the RRC/MAC-CE transmitted by the BS configures or activate a plurality of (e.g., 8 or 16) states such as TCI states associated with a QCL state, SRS resource, port parameter, power control parameter, etc. In a second stage 304, the MAC-CE/DCI transmitted by the BS indicates one state, which can be applied to PDCCH, PDSCH, CSI-RS, PUCCH, PUSCH and/or SRS transmissions, for example. Thus, one state ID indicated by MAC-CE or DCI signaling can the selected from a pool of state IDs. In some embodiments, in order to pre-track or maintain some candidate path-loss RS(s) in advance, one MAC-CE is provided for activating a path-loss RS for tracking.

In some embodiments, the path-loss RS(s) to be activated in the MAC-CE transmitted by the BS is selected from the set of path-loss RS(s) configured by RRC signaling. Thereafter, the UE will track the path-loss RS(s) to be activated in the MAC-CE. In some embodiments, the path-loss measurement for the selected RS is performed N1 ms after an ACK signal corresponding to the PDSCH carrying the MAC-CE is received by the UE. In some embodiments, N1 is a positive value (e.g., N1=3 ms). In some embodiments, the path-loss estimate is valid N2 ms after X measurement samples N3 after ACK corresponding to the PDSCH carrying the MAC-CE, wherein X is up to UE capability or a positive integer.

Figure 4:
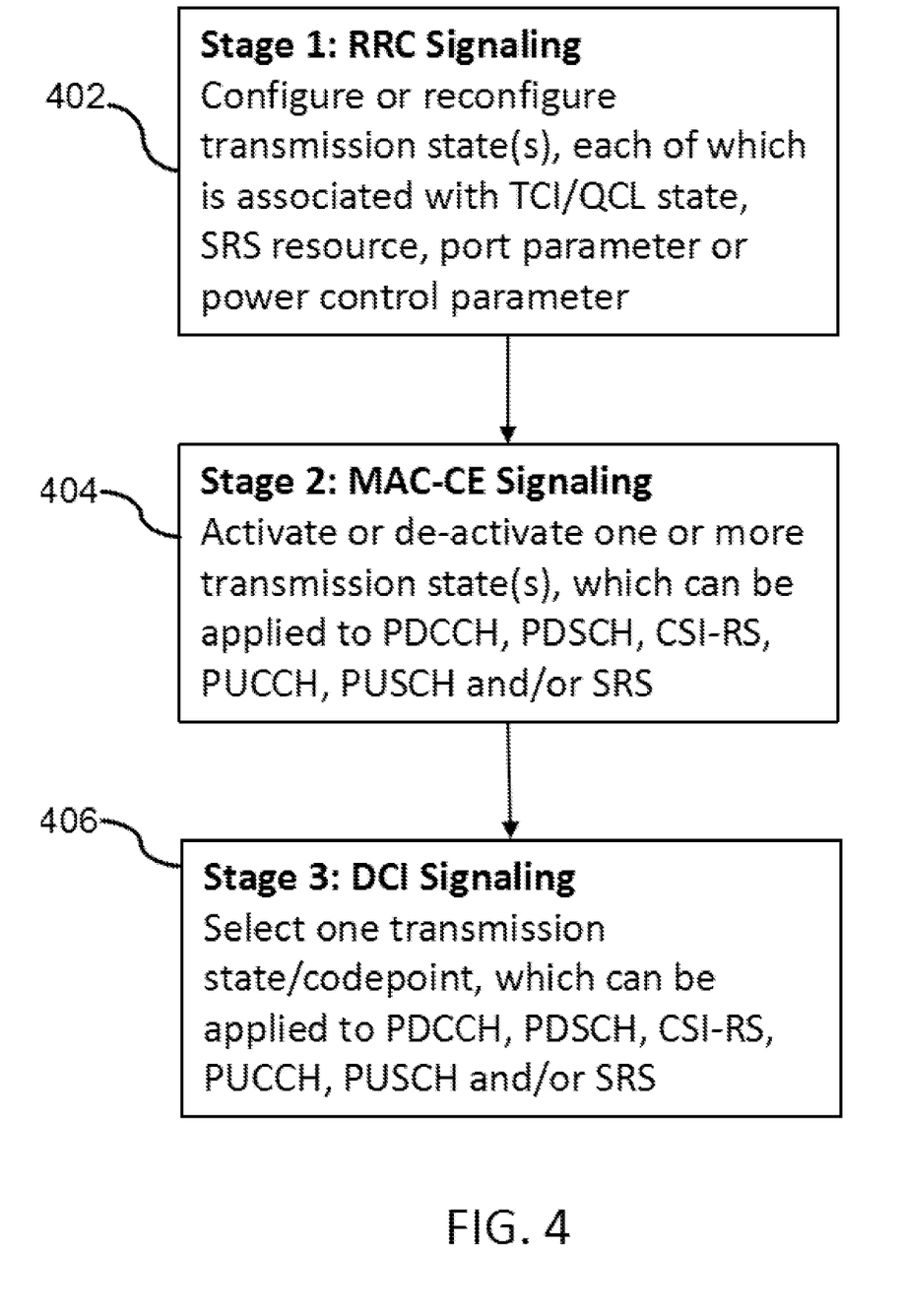
FIG. 4 illustrates a flow chart of another method of determining a state of a reference signal to be tracked, in accordance with some embodiments.

In a further embodiment, when the mechanisms of RRC, MAC-CE and DCI are used for indicating one transmission state, the number of transmission states activated by a MAC-CE command transmitted by the BS may be beyond the maximum number of path-loss RS(s) capable of being tracked and maintained by a UE. FIG. 4 illustrates a flowchart of an exemplary process, in accordance with some embodiments. In a first stage 402, RRC signaling configures or reconfigures one or more transmission states (e.g., up to 64 states), each of which is associated with a TCI/QCL state, SRS resource, port parameter, power control parameter, etc. In a second stage 404, MAC-CE signaling activates or de-activates one or more transmission states, which can be applied to PDDCH, PDSCH, CSI-RS, PUCCH, PUSCH and/or SRS. In a third stage 406, DCI signaling selects one transmission state or codepoint, which can be applied to PDCCH, PDSCH, CSI-RS, PUCCH, PUSCH and/or SRS.

In an exemplary scenario, Q transmission states can be activated (e.g., Q=8 or 16) by a MAC-CE command transmitted by the BS, but path-loss RSs in only N states out of the Q transmission states can be tracked or maintained by a UE (e.g., N=4). In this scenario, the UE can implement one or predetermined priority rules for determining the N states out of the Q transmission states, in accordance with various embodiments. In some embodiments of the predetermined priority rule, reference signals having a lower codepoint identification (ID) have a higher priority. In some embodiments, reference signals having a lower transmission state ID have a higher priority. In other embodiments, reference signals having a higher codepoint ID have a higher priority. In other embodiments, reference signals having a lower cell ID have a higher priority. In some embodiments, reference signals having a higher cell ID have a higher priority. In some embodiments, reference signals having a higher resource ID have a higher priority. In some embodiments, reference signals having a lower resource ID have a higher priority. In further embodiments, N reference signals in an active transmission state having N lowest or highest IDs are selected. In some embodiments, N reference signals associated with an active transmission codepoint having N lowest or highest IDs are selected. In some embodiments, reference signals in a transmission state or having codepoint ID having a flag associated with the transmission state or codepoint ID are selected.

In some embodiments, the number of different path-loss RS(s) associated with activated transmission state(s) is no more than a predetermined number, which can be determined based on a maximum number of path-loss RSs that can be tracked and maintained by a UE, or a specific value. In other embodiments, the number of activated transmission state(s) with different path-loss RS(s) is no more than a predetermined number, which can be determined based on a maximum number of path-loss RSs that can be tracked and maintained by a UE, or a specific value. In further embodiments, a command for mapping a path-loss RS with a transmission state is provided by the BS.

In further embodiments, within a given time unit (e.g., a slot), a UE is not expected to be configured with a number of tracking path-loss RS(s) that is larger than a maximum number of path-loss RSs that can be tracked and maintained by the UE, or a specific value (e.g., 4). In some embodiments, when counting the number of path-loss RS(s) to be tracked in a given time unit (e.g., 1 slot), the following rules may be implemented:
1. MAC-CE updated path-loss RS(s) are tracked, if the number of RRC configured path-loss RSs is more than a threshold (e.g., 4); otherwise, RRC configured path-loss RSs are tracked.
2. If default beam and path-loss RS function is enabled, and there is a CORESET in an active BWP or serving CELL, RS(s) in transmission state(s) or QCL assumption in lowest CORESET(s) in an active BWP are tracked.
3. If default beam and path-loss RS function is enabled, and there is NO CORESET in an active BWP or serving cell, RS(s) in active transmission state for PDSCH with lowest ID are tracked.
4. If transmission state for UL transmission is enabled, RS(s) in the active transmission state are tracked.
5. Furthermore, the RS in the active transmission state can be the RS(s) corresponding to QCL-TypeD in the transmission state.
6. Furthermore, if there is no QCL-TypeD in the transmission state, the RS in the active transmission state can be the RS(s) corresponding to QCL-TypeA, QCL-TypeB, QCL-TypeC or other QCL-Type in the transmission state.
7. Furthermore, if there are two RS(s) in a transmission state, the RS in the active transmission state can be the RS(s) corresponding to QCL-TypeD in the transmission state.
8. Furthermore, the RS in the active transmission state can be a path-loss RS associated with the active transmission state.

In some embodiments, a UE does not expect to simultaneously maintain more than four pathloss estimates per serving cell for all PUSCH/PUCCH/SRS transmissions, except for SRS transmissions configured by an IE SRS-Positioning-Config parameter. In this scenario, one or more of the following rules can be implemented:
1. If the number of RRC configured RS resources for pathloss estimates for PUCCH, PUSCH and SRS is greater than 4, the UE shall maintain pathloss estimates corresponding to the RSs activated by MAC-CE per active BWP per serving cell.
2. If the UE is provided enableDefaultBeamPlFor-PUSCH0_0, enableDefaultBeamPlForPUCCH, or enableDefaultBeamPlForSRS, and if CORESETs are provided in an active DL BWP in a serving cell, the UE shall maintain pathloss estimates corresponding to the RS resource with 'QCL-TypeD' in the TCI state or the QCL assumption of CORESET(s) with the lowest and highest indexes in the active BWP in the serving cell.
3. If the UE is provided enableDefaultBeamPlForSRS, and if CORESETs are not provided in an active DL BWP in a serving cell, the UE shall maintain pathloss estimates corresponding to the RS resources with 'QCL-TypeD' in the active PDSCH TCI state(s) with the lowest and highest indexes in the active BWP in the serving cell.
4. If RS resource(s) updated by MAC-CE command transmitted by the BS are not within the group of current RS resources for maintaining pathloss estimate(s), UE shall apply the higher layer filtered RSRP(s) corresponding to the RS resource(s) starting from 2 ms after the [N]-th measurement sample since the first slot that is after slot $k+3 \cdot N_{slot}^{subframe,\mu}$ where the UE transmits a PUCCH with HARQ-ACK information for the PDSCH providing the MAC CE and $\mu$ is the SCS configuration for the PUCCH.
5. If RS resource(s) updated by a MAC-CE command transmitted by the BS are within the group of current RS resources for maintaining pathloss estimate(s), the UE shall apply the higher layer filtered RSRP(s) corresponding to the RS resource(s) starting from the first slot that is after slot $k+3 \cdot N_{slot}^{subframe,\mu}$ where k is the slot where the UE transmits a PUCCH with HARQ-ACK information for the PDSCH providing the MAC CE and $\mu$ is the SCS configuration for the PUCCH.

Figure 5:
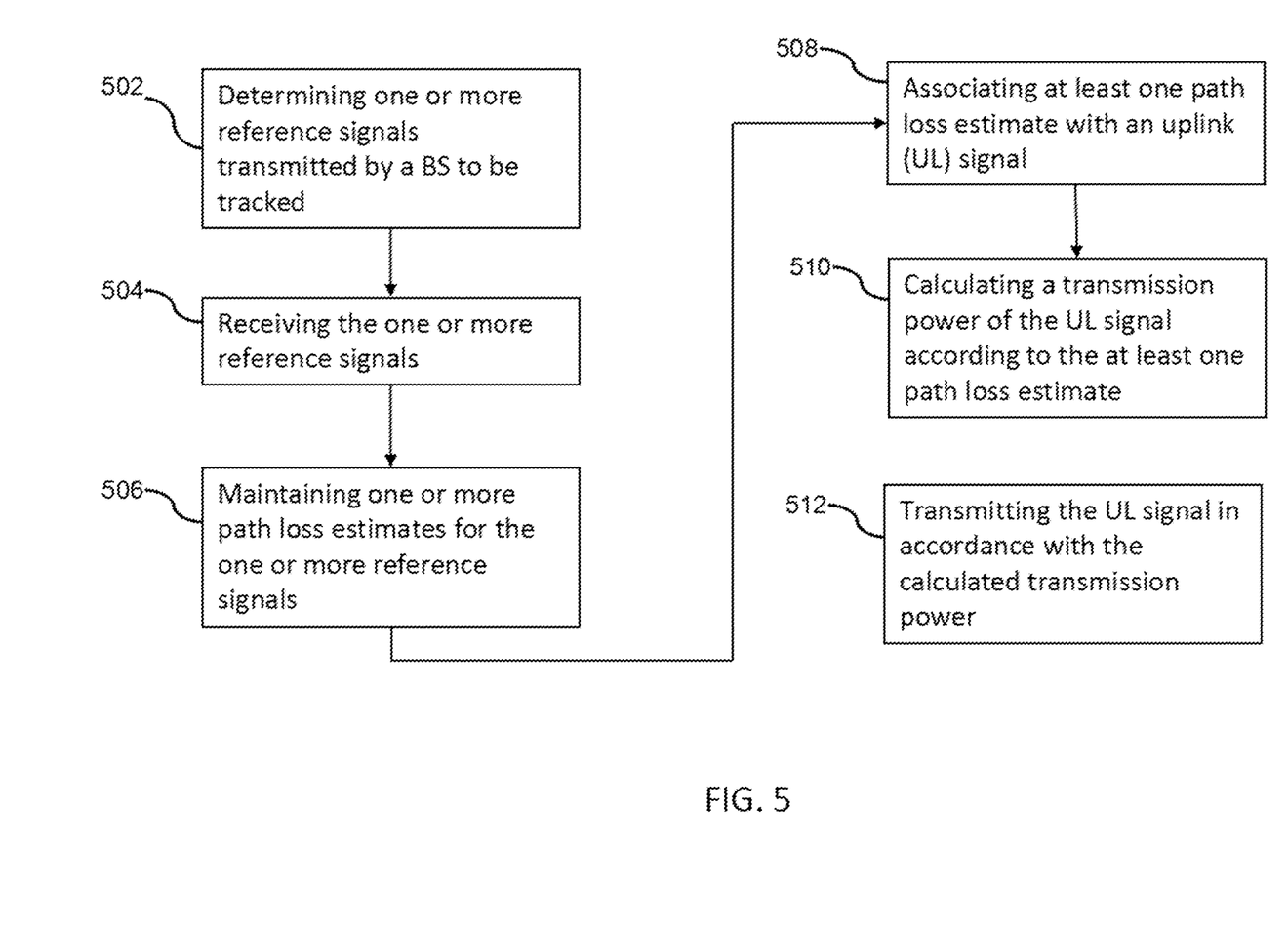
FIG. 5 illustrates a flow chart of a method of controlling uplink transmission power, in accordance with some embodiments.

FIG. 5 illustrates a method for controlling transmit power of a UE, in accordance with some embodiments. At operation 502, the UE determines one or more reference signals transmitted by a BS to be tracked. In accordance with various embodiments the reference signals to be tracked are selected by one or more of the criteria and/or priority rules described above. At operation 504, the UE receives or tracks the one or more reference signals selected in operation 502. At operation 506, the UE maintains one or more path loss estimates for the one or more reference signals. In some embodiments, the one or more reference signals are tracked and maintained prior to a current default path-loss RS is updated by the BS. Next, at operation 508, the UE associates at least one path loss estimate with an uplink (UL) signal, wherein the at least one path loss estimate is selected from the one or more maintained path loss estimates. At operation 510, the UE calculates a transmission power of the UL signal according to the at least one path loss estimate. At operation 512, the UE transmits the UL signal in accordance with the calculated transmission power using a transmission beam corresponding to the at least one path loss estimate.

Figure 6:
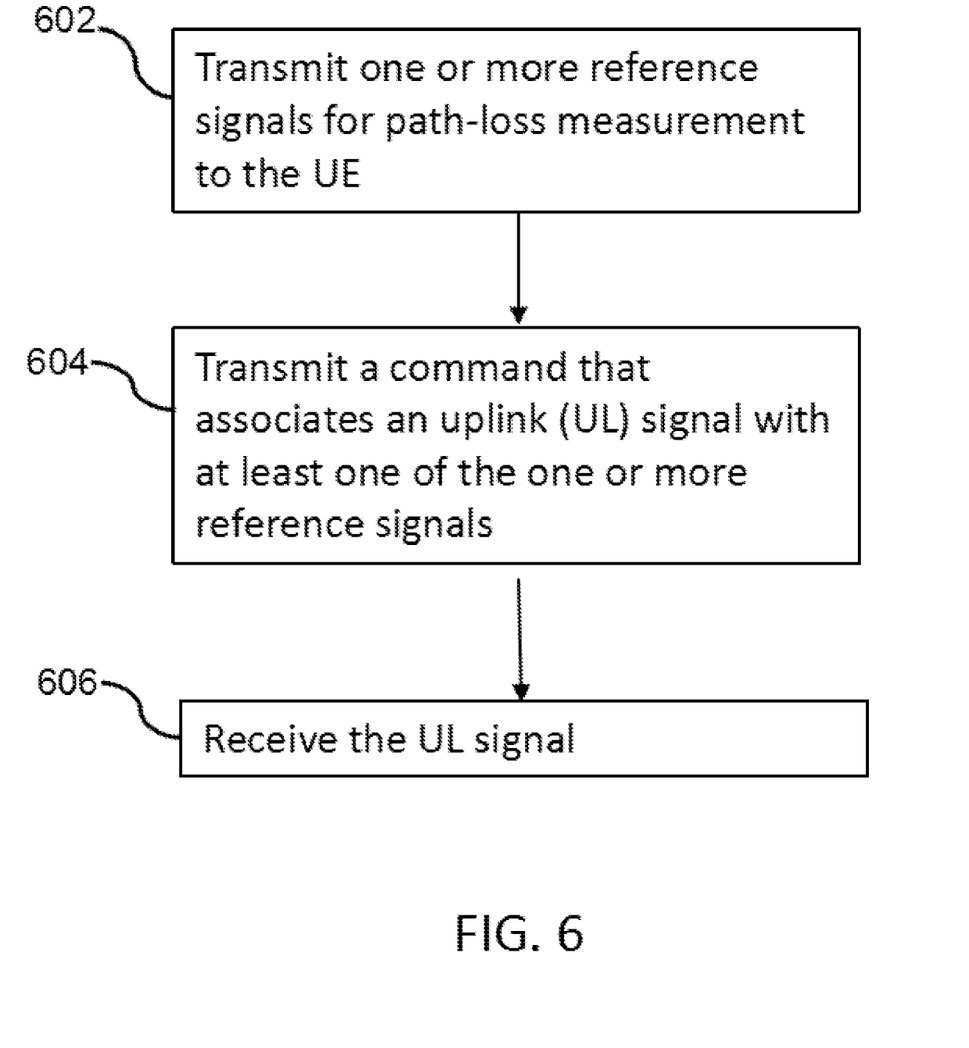
FIG. 6 illustrates a flow chart of a method of controlling uplink transmission power, in accordance with further embodiments.

FIG. 6 illustrates a flow chart of a method performed by the BS for controlling uplink transmission power of a UE, in accordance with some embodiments. As shown in FIG. 6, at operation 602, the BS transmits one or more reference signals (RSs) for path-loss measurement to the UE. In accordance with various embodiments, the one or more RSs can be determined based on one or more of the criteria and/or priority rules disclosed herein. At operation 604, the BS transmits a command that associates an UL signal to be transmitted by the UE with at least one of the one or more RSs. At operation 606, the BS receives the UL signal from the UE.

Figure 7:
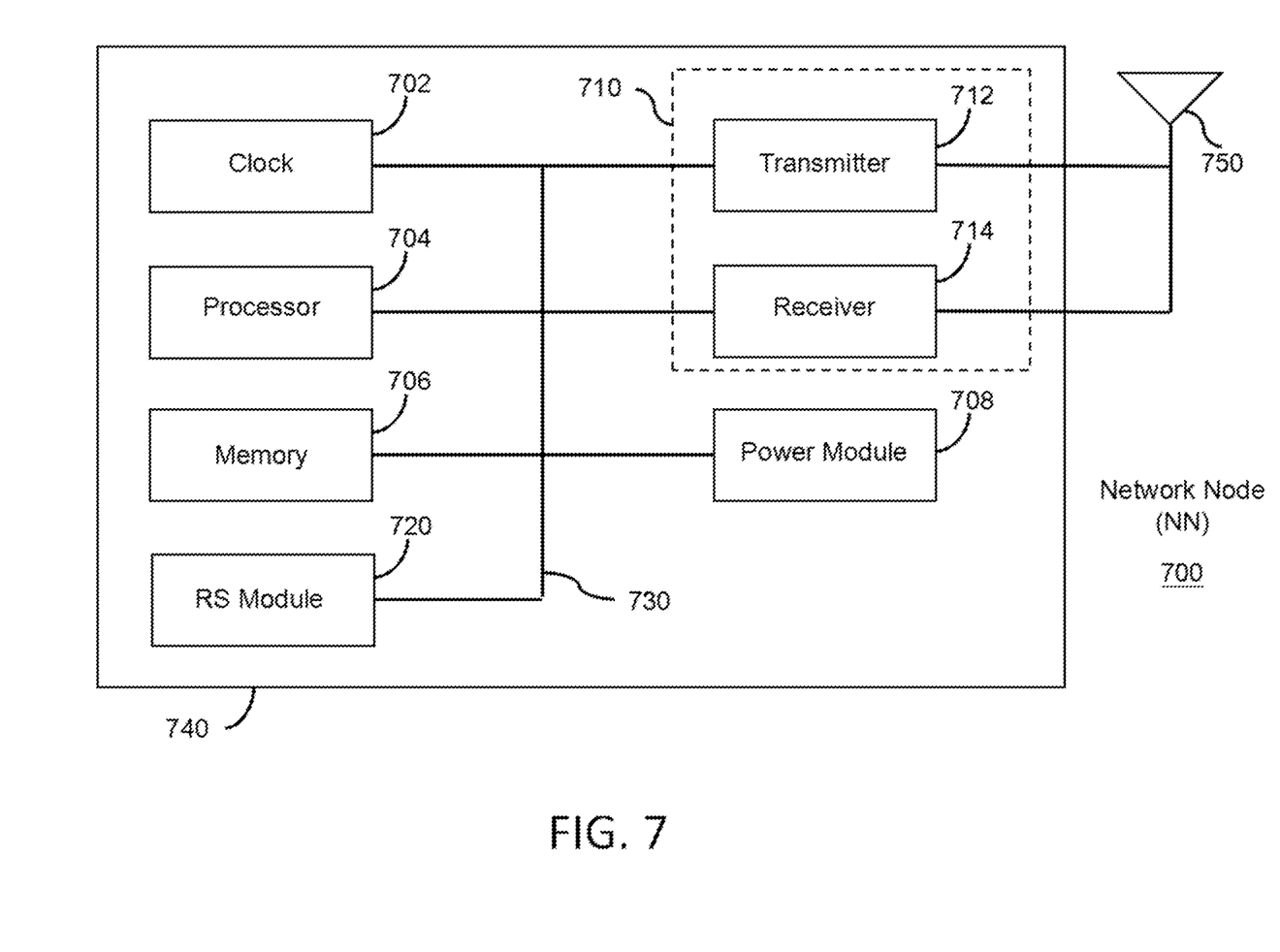
FIG. 7 illustrates a block diagram of a network node configured to carry out the methods disclosed in the present disclosure, in accordance with some embodiments.

FIG. 7 illustrates a block diagram of a network node (NN) 700, in accordance with various embodiments of the disclosure. The NN 700 is an example of a wireless communication device or wireless communication node that can be configured to implement the various methods described herein. In some embodiments, the NN 700 may be wireless communication node such as a base station (BS), as described herein. In other embodiments, the NN 700 may be a wireless communication device such as a user equipment device (UE), as described herein. As shown in FIG. 7, the NN 700 includes a housing 740 containing a system clock 702, a processor 704, a memory 706, a transceiver 710 comprising a transmitter 712 and receiver 714, a power module 708, and a RS module 720.

In this embodiment, the system clock 702 provides the timing signals to the processor 404 for controlling the timing of all operations of the NN 700. The processor 704 controls the general operation of the NN 700 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 706, which can include both read-only memory (ROM) and random access memory (RAM), can provide instructions and data to the processor 704. A portion of the memory 706 can also include non-volatile random access memory (NVRAM). The processor 704 typically performs logical and arithmetic operations based on program instructions stored within the memory 706. The instructions (a.k.a., software) stored in the memory 706 can be executed by the processor 704 to perform the methods described herein. The processor 704 and memory 706 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 710, which includes the transmitter 712 and receiver 714, allows the NN 700 to transmit and receive data to and from an external network node (e.g., an UE or AP). An antenna 750 is typically attached to the housing 740 and electrically coupled to the transceiver 710. In various embodiments, the NN 700 includes (not shown) multiple transmitters, multiple receivers, and multiple transceivers. In some embodiments, the antenna 750 includes a multi-antenna array that can form a plurality of beams each of which points in a distinct direction in accordance with MIMO beamforming techniques.

The RS module 720 may be implemented as part of the processor 704 programmed to perform the functions herein, or it may be a separate module implemented in hardware, firmware, software or a combination thereof. In accordance with various embodiments, the RS module 720 is configured to determine one or more RSs to be transmitted by the BS, or determine one or more RSs to be tracked and maintained by the UE, as described herein. In some embodiments, the RS module 720 can be implemented as software (i.e., computer executable instructions) stored in a non-transitory computer-readable medium that when executed by processor 704, transform the processor 704 into a special-purpose computer to perform the RS determining, tracking and maintaining operations described herein.

The various components and modules discussed above within housing 740 are coupled together by a bus system 730. The bus system 730 can include a data bus and, for example, a power bus, a control signal bus, and/or a status signal bus in addition to the data bus. It is understood that the modules of the NN 700 can be operatively coupled to one another using any suitable techniques and mediums. It is further understood that additional modules (not shown) may be included in the NN 700 without departing from the scope of the disclosure.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for controlling a transmit power of a wireless communication device, comprising:
   determining one or more reference signals transmitted by a wireless communication node, wherein the one or more reference signals comprise: a reference signal in a transmission state or a quasi co-location (QCL) assumption in a control resource set (CORESET), wherein the CORESET is associated with one of: a Mth lowest identification (ID) value, Nth highest ID value, and a predetermined ID value, wherein M and N are integers;
   maintaining one or more path loss estimates for the one or more reference signals;
   associating at least one path loss estimate with an uplink (UL) signal;
   calculating a transmission power of the UL signal according to the at least one path loss estimate; and
   transmitting the UL signal in accordance with the calculated transmission power.

2. The method of claim 1, wherein a parameter related to default beam and path-loss mode is enabled or provided.

3. The method of claim 1, wherein the one or more reference signals further comprise:
   a reference signal in an active transmission state associated with a predetermined identification (ID) value, the predetermined ID value being one of:
      a Mth lowest ID value, a Nth highest ID value, and a predetermined integer, wherein
      M and N are integers.

4. The method of claim 1, wherein the one or more reference signals further comprise;
   N reference signals in active transmission state(s) having N lowest or highest IDs, or
   N reference signals in active transmission codepoint(s) having N lowest or highest IDs, wherein
   N is a positive integer.

5. The method of claim 1, wherein, if a parameter related to default beam and path loss reference signal mode is enabled or provided, and there is a control resource set (CORESET) in an active bandwidth part (BWP),
   the one or more reference signals further comprise reference signals in a transmission state or associated with a QCL assumption in a lowest CORESET in the active BWP.

6. The method according to claim 5, wherein the one or more reference signals further comprise a reference signal in an active transmission state that corresponds to a reference signal associated with QCL-TypeD in the transmission state.

7. The method of claim 1, wherein determining the one or more reference signals further comprises:
   determining the one or more reference signals according to a predetermined priority rule, and the predetermined priority rule comprises:
      a reference signal in a transmission state or a quasi co-location (QCL) assumption in a control resource set (CORESET) is prioritized over a reference signal in an active transmission state for a physical downlink shared channel (PDSCH).

8. The method of claim 1, wherein determining the one or more reference signals further comprises:
   determining the one or more reference signals according to a predetermined priority rule, and the predetermined priority rule comprises:
      a reference signal in an active transmission state for a physical downlink shared channel (PDSCH) is prioritized over a reference signal in a transmission state or associate with a quasi co-location (QCL) assumption.

9. A method for controlling a transmit power of a wireless communication device, comprising:
   transmitting one or more reference signals for path-loss measurement to the wireless communication device, wherein the one or more reference signals comprise: a reference signal in a transmission state or a quasi co-location (QCL) assumption in a control resource set (CORESET), wherein the CORESET is associated with one of: a Mth lowest identification (ID) value, Nth highest ID value, and a predetermined ID value, wherein M and N are integers;
   transmitting a command that associates an uplink (UL) signal with at least one of the one or more reference signals; and
   receiving the UL signal.

10. The method of claim 9, wherein a parameter related to default beam and path-loss mode is enabled or provided.

11. The method of claim 9, wherein the one or more reference signals further comprise:
   a reference signal in an active transmission state associated with a predetermined identification (ID) value, the predetermined ID value being one of:
      a Mth lowest ID value, a Nth highest ID value, and a predetermined integer, wherein
      M and N are integers.

12. The method of claim 9, wherein the one or more reference signals further comprise;
   N reference signals in active transmission state(s) having N lowest or highest IDs, or
   N reference signals in active transmission codepoint(s) having N lowest or highest IDs, wherein
      N is a positive integer.

13. The method of claim 9, wherein, if a parameter related to default beam and path loss reference signal mode is enabled or provided, and there is a control resource set (CORESET) in an active bandwidth part (BWP),
   the one or more reference signals further comprise reference signals in a transmission state or associated with a QCL assumption in a lowest CORESET in the active BWP.

14. The method according to claim 13, wherein the one or more reference signals further comprise a reference signal in an active transmission state that corresponds to a reference signal associated with QCL-TypeD in the transmission state.

15. The method of claim 9, wherein
   the reference signal is activated in a medium access control-control element (MAC-CE) from a set of reference signals configured by a radio resource control (RRC) signaling.

16. The method of claim 9, wherein the one or more reference signals further comprise:
   N reference signals in active transmission state(s) having N lowest or highest IDs, or
   N reference signals in active transmission codepoint(s) having N lowest or highest IDs, wherein
      N is a positive integer.

17. A wireless communication device, comprising:
   a memory storing computer-executable instructions;
   at least one processor coupled to the memory and configured to execute the computer-executable instructions to cause the wireless communication device to:
      determine one or more reference signals transmitted by a wireless communication node according to a predetermined priority rule, wherein the predetermined priority rule comprises:
         a reference signal in a transmission state or a quasi co-location (QCL) assumption in a control resource set (CORESET) is prioritized over a reference signal in an active transmission state for a physical downlink shared channel (PDSCH); or
         a reference signal in an active transmission state for a physical downlink shared channel (PDSCH) is prioritized over a reference signal in a transmission state or associate with a quasi co-location (QCL) assumption;
      maintain one or more path loss estimates for the one or more reference signals; associating at least one path loss estimate with an uplink (UL) signal;
      calculate a transmission power of the UL signal according to the at least one path loss estimate; and
      transmit, using a transmitter, the UL signal in accordance with the calculated transmission power.

18. A wireless communication node, comprising:
   a memory storing computer-executable instructions;
   at least one processor, coupled to the memory, and configured to execute the computer-executable instructions to cause the wireless communication node to:
      transmit, using a transmitter, the one or more reference signals for path-loss measurement to the wireless communication device, wherein the one or more reference signals comprise: a reference signal in a transmission state or a quasi co-location (QCL) assumption in a control resource set (CORESET), wherein the CORESET is associated with one of: a Mth lowest identification (ID) value, Nth highest ID value, and a predetermined ID value, wherein M and N are integers;
      transmit, using the transmitter, a command that associates an uplink (UL) signal with at least one of the one or more reference signals; and
      receive, using a receiver, the UL signal.

* * * * *

UNITED STATES PATENT AND TRADEMARK OFFICE
CERTIFICATE OF CORRECTION

PATENT NO. : 12,369,126 B2  
APPLICATION NO. : 17/856200  
DATED : July 22, 2025  
INVENTOR(S) : Bo Gao et al.

Page 1 of 1

It is certified that error appears in the above-identified patent and that said Letters Patent is hereby corrected as shown below:

In the Claims

In Column 16, Claim 4, Line 50, delete "--;--" and replace with "--:--".

Signed and Sealed this  
Ninth Day of September, 2025

Coke Morgan Stewart  
*Acting Director of the United States Patent and Trademark Office*